Patented Mar. 18, 1952

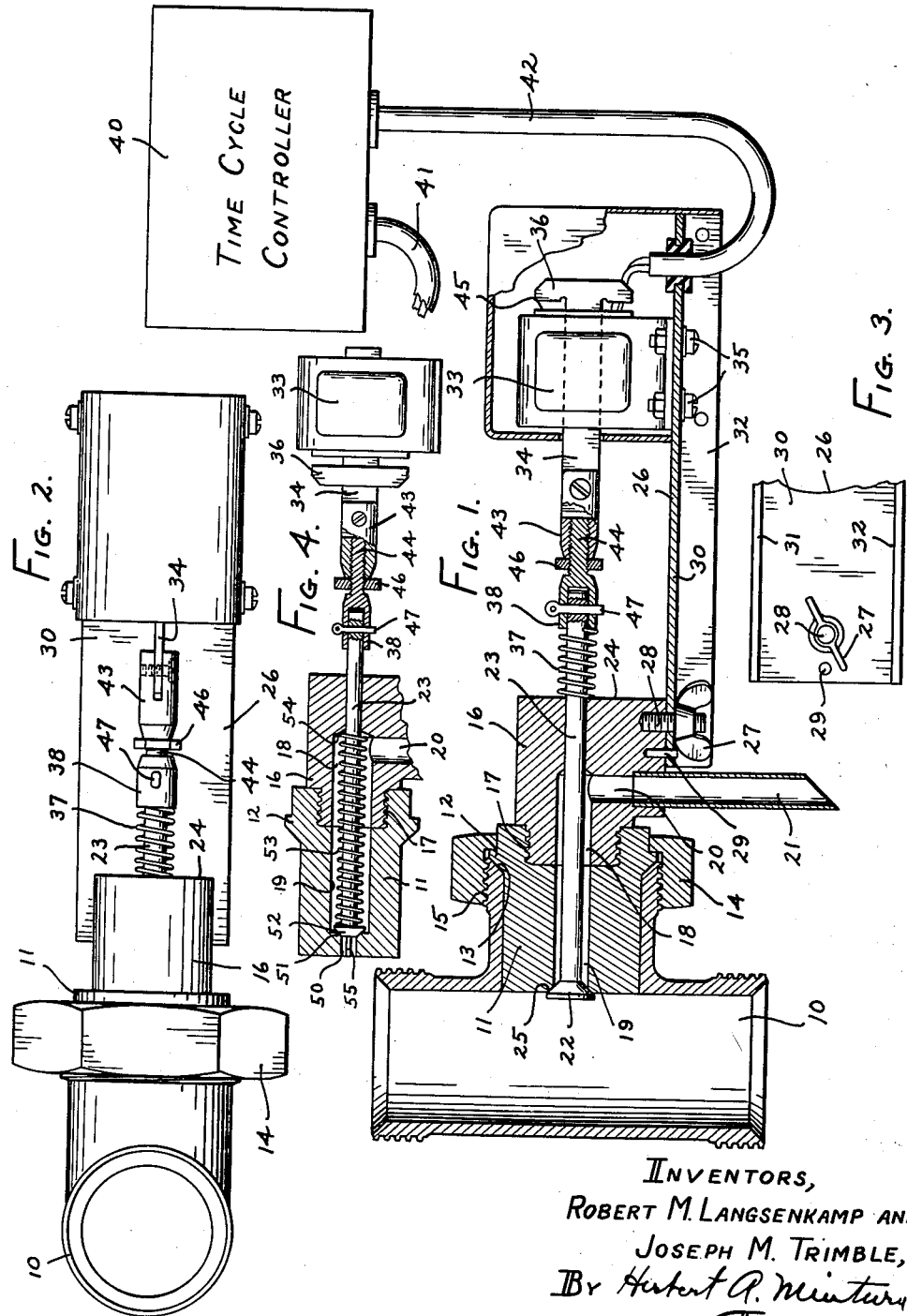

2,589,712

UNITED STATES PATENT OFFICE 2,589,712

FLOW LINE SAMPLER

Robert M. Langsenkamp, Indianapolis, and Joseph M. Trimble, Lebanon, Ind., assignors to The Langsenkamp-Wheeler Brass Works, Inc., Indianapolis, Ind., a corporation of Indiana Application December 22, 1949, Serial No. 134,546

2 Claims. (Cl. 73—422)

This invention relates to a device for automatically withdrawing a sample of milk from a flow line at stated intervals for the purpose of testing the state of that milk, such for example as determining the butterfat content. The device operates automatically in a predetermined time cycle so that samples of the milk from the flowing volume in a conducting pipe may be withdrawn from that pipe in sufficient quantities and at sufficient times apart whereby the flow may be checked to see that a constant butterfat content is being maintained.

The milk which is being sampled is maintained under pressure in order to induce the desired flow from one point to another, and advance of this pressure is taken so that when a valve is opened from the conductor, some of the milk in that conductor may be forced out of the pipe, and conducted to any suitable point where the sample is to be collected. It is desirable however to keep the quantity of the sample at each release of the milk from the line to a relatively small volume in order to prevent waste of the milk. Furthermore it is necessary that the sample being taken will be quite accurate as to its volume so that the same volume is taken at each sampling operation.

Furthermore in addition to the desired operation as above indicated, it is necessary that all of the parts coming into contact with the milk be made in what is termed a "sanitary" manner so that the various parts may be quickly disassembled for cleaning purposes, and then reassembled quickly. Therefore it is also desirable to hold the number of parts at the lowest possible number, and also to so form those parts that they may be assembled without any difficulty, and in such manner that it is impossible to assemble them in the wrong relationship.

One particular form of the invention is illustrated in the accompanying drawing, in which Fig. 1 is a view in vertical transverse and central section;

Fig. 2 is a top plan view;

Fig. 3, is a detail in bottom plan of a portion of the mounting arm for the solenoid; and Fig. 4, is a view in vertical, central longitudinal section of a modified form of the invention.

Referring to the drawing, in which like characters of reference indicate like parts in the several views, a standard flow pipe T 10 is employed to receive a valve body 11 slidably entered from the side opening to have its inner end or face terminate substantially flush with the interior wall of the longitudinal bore through the T. This body 11 is provided with a flange 12 to seat against the tapered rim 13 of the T 10 and there removably secured by the union nut 14. The union nut 14 is quickly detachable from the T 10 by turning it about the threads 15, all in the usual manner and construction as is now common to piping in the dairy industry.

A body head 16 is screw-threadedly interconnected with the valve body 11 through the quick detachable threads 17. This head 16 has a bore 18 which axially aligns with the bore 19 provided through the body 11. The bore 18 ends within the head 16 and is provided with a discharge bore 20 leading transversely therefrom to open into a drip pipe 21 which is open at all times, and turned to hang downwardly so that flow therefrom is had by influence of gravity.

A valve 22 is carried by a stem 23. This valve stem 23 is axially guided through the head 16 between the inner end of the bore 18 and the outer face 24 of the head 16 in a manner which will permit the stem 23 to be free to reciprocate longitudinally so as to move the valve 22 in relation to its seat 25 provided around the end of the bore 19 which opens into the main flow chamber of the T 10. The external or outside diameter of the stem 23 is made to be less than the diameters of the bores 18 and 19 so that there is a milk flow space around the stem through those bores and into the transverse bore 20 and out through the drip pipe 21.

An arm 26 is removably supported from the head 16 by any suitable means, herein shown as being engaged against the underside of the head 16 by means of a wing nut 27 screw-threadedly engaging over a stud 28 fixed to the head 16. To prevent rotation of the arm 26 about the stud 28, a pin 29 is fixed in the head 16 to extend through a hole provided in the arm 26. The arm 26 may be of any desired construction, and is herein shown as comprising a straight plate 30 having the side, downturned flanges 31 and 32.

Spaced along the arm 26 from the head 16 is a solenoid magnet 33 having an armature 34 longitudinally aligned with the valve stem 23. The magnet 33 is fixed in position on the arm 26 by any suitable means such as by the screws 35.

The magnet 33 is so constructed that when it is energized, the armature 34 will be shifted to the left as viewed in Fig. 1. A head 36 limits the left-hand travel of the armature 34.

The valve 22 is normally seated by means of a compression spring 37 which bears between the face 24 of the head 16 and a stop member 38 carried by the stem 23.

When milk is flowing through the T 10, and the valve 22 is normally seated, there is no flow from the drip pipe 21, which pipe is the one from which samples of the flow through the T 10 are to be taken. A time cycle controller of any suitable construction, herein generally designated by the numeral 40 intermittently closes an electrical circuit from the power line 41 through the cable 42 and the magnet 33 for corresponding intermittent energization of the magnet. The arrangement is such that when this magnet 33 is energized accordingly, the armature 34 will be kicked to the left to the limit as determined by the head 36 striking the outer end of the magnet 33. In so doing, the armature 34 pushes the valve stem 23 to overcome the normal return push of the spring 37, and thereby lifts the valve 22 from its seat 25, to permit the milk to flow into the bores 19, 18, 20, and drop out the pipe 21. By adjusting the permissible amount of travel of the armature 34, the lift of the valve 22 from its seat 25 is determined, and that lift together with the time interval of the lift determines the quantity of the sample which is to be taken in that operation.

While the armature 34 may be entirely disconnected from the stem 23, in the present form, the armature 34 is interconnected with the stem 23 by means of a head 43 screw-threadedly engaging the stud 44 which extends from the abutment member 33. By suitably adjusting the stud 44 longitudinally of the head 43, the spacing of the head 36 is varied in relation to the face or stop side 45 of the magnet 33. The adjustment is secured by means of the jam nut 46 screw-threadedly engaging the stud 44 to abut the end of the head 43. The member 38 may be quickly detached from the end of the stem 23 by pulling out the pin 47 which frictionally engages through the member 38 and the end portion of the stem 23.

Thus once the power line 41 is energized, the valve 22 is repeatedly lifted by the armature 34 and then closed by the spring 37 at the rate determined by the operation of the time cycle controller 40. In many instances, this cycle is completed once in ten seconds.

Referring to the form illustrated in Figure 4, the outer end of the bore 19 is provided with a restricted or reduced diameter portion 50 and a valve seat 51 is provided around the juncture between the two bores 19 and 50. The valve stem 23 carries a valve 52 to be seated on the seat 51 under the urging of spring 53 surrounding the stem 23 and abutting by one end an abutment on the stem constituting in the present instance the back of the valve 52, and by its other end against an abutment fixed relative to the stem, here shown as being the rear end face 54 across the bore 18 of the body 16.

In this modified form, the stem 23 is pulled by the armature 34 for opening the valve 52.

Also in this modified form there is a metering pin 55 carried by the stem to extend beyond the valve 52 into the bore 50. The pin 55 is of that selected diameter which will give a predetermined flow through the bore around the pin when the valve is unseated.

While we have herein shown and described our invention in the one particular form, it is obvious that structural variations may be employed without departing from the spirit of the invention, and we therefore do not desire to be limited to that precise form beyond the limitations which may be imposed by the following claims.

We claim:

1. For taking samples of a fluid from a flow line under pressure; the combination of a T fitting intercepting said line to provide a side outlet through the T; a valve body telescoping within said T through and to seat on the outer margin of said outlet to have the body inner face substantially flush with the flow line bore through the T; quick releasable means for retaining said body in said seating position; a head; quick releasable means securing said head to said body; said body and said head having a common axial bore extending thereacross from a closed end in said head to an opening through said body face; said head having an outlet bore leading from said first bore to discharge externally of the head; a valve stem slidably entering said first bore through said closed end to traverse the first bore; a valve seat about said body face bore opening; a valve carried by said stem to seat on said seat when said stem travels toward said opening; said opening being defined by a cylindrical passageway from said first bore to said face; a metering pin of constant diameter throughout its length extending from said valve into said passageway, the size of the pin determining the flow rate through the passageway upon an unseated valve condition; a spring surrounding said stem within said first bore bearing between said bore closed end and said valve normally seating the valve; and electromagnet means for retracting said stem against the opposition of said spring to unseat said valve.

2. For taking samples of a fluid from a flow line under pressure; the combination of a T fitting intercepting said line to provide a side outlet through the T; a valve body telescoping within said T through and to seat on the outer margin of said outlet to have the body inner face substantially flush with the flow line bore through the T; quick releasable means for retaining said body in said seating position; a head; quick releasable means securing said head to said body; said body and said head having a common axial bore extending thereacross from a closed end in said head to an opening through said body face, said head having an outlet bore leading from said first bore to discharge externally of the head; a valve stem slidably entering said first bore through said closed end to traverse the first bore; a valve seat about said body face bore opening; a valve carried by said stem to seat on said seat when said stem travels toward said opening; said opening being defined by a cylindrical passageway from said first bore to said face; a metering pin of constant diameter throughout its length extending from said valve into said passageway, the size of the pin determining the flow rate through the passageway upon an unseated valve condition; a spring surrounding said stem within said first bore bearing between said bore closed end and said valve normally seating the valve; and electromagnet means for retracting said stem against the opposition of said spring to unseat said valve; said head outlet bore being located to leave the common bore adjacent its said closed end; and pin disengageable means interconnecting said stem and said electro-magnet means.

ROBERT M. LANGSENKAMP.
JOSEPH M. TRIMBLE.

REFERENCES CITED

The following references are of record in the file of this patent:

UNITED STATES PATENTS

| Number | Name | Date |
| --- | --- | --- |
| 604,358 | Alexander | May 24, 1898 |
| 1,822,668 | Protzeller | Sept. 8, 1931 |
| 1,970,726 | Barrett | Aug. 21, 1934 |
| 2,140,920 | Myracle | Dec. 20, 1938 |
| 2,183,338 | Slough | Dec. 12, 1939 |
| 2,213,663 | Berard | Sept. 3, 1940 |

FOREIGN PATENTS

| Number | Country | Date |
| --- | --- | --- |
| 365,204 | Great Britain | Jan. 21, 1932 |
| 631,928 | France | Sept. 24, 1927 |